3,182,081
SUBSTITUTED MERCAPTO-ACETAMIDES
Moses Wolf Goldberg, Upper Montclair, and Hanns
Hanina Lehr, Montclair, N.J., assignors to Hoffmann-
La Roche Inc., Nutley, N.Y., a corporation of New
Jersey
No Drawing. Filed Apr. 2, 1963, Ser. No. 269,871
6 Claims. (Cl. 260—535)

This invention relates to substituted α-mercapto-acetamides and to processes for their preparation. More particularly, this invention relates to α-mercapto-acetamides of the formula

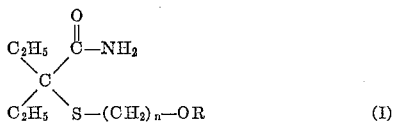

(I)

wherein R is hydrogen, lower alkyl or lower alkoxy lower alkyl, e.g., methyl, ethyl, isopropyl, butyl, ethoxyethyl, etc., and $n$ is a whole number from 2 to 6. The term "lower alkyl" as used herein is to be understood to include straight or branched chain alkyl groups having from 1 to 7 carbon atoms.

The above compounds of Formula 1 exhibit hypnotic and muscle relaxant activity and are useful as hypnotics and muscle relaxants.

Examples of compounds of Formula I include:

α-(2-ethoxyethylmercapto)-α,α-diethylacetamide,
α-(2-methoxyethylmercapto)-α,α-diethylacetamide,
α-(2-butoxyethylmercapto)-α,α-diethylacetamide,
α-(3-hydroxypropylmercapto)-α,α-diethylacetamide,
α-(3-methoxypropylmercapto)-α,α-diethylacetamide,
α-(3-ethoxypropylmercapto)-α,α-diethylacetamide,
α-(5-ethoxypentylmercapto)-α,α-diethylacetamide,
α-(6-ethoxyhexylmercapto)-α,α-diethylacetamide,
α-[2-(2-ethoxyethoxy)-ethylmercapto]-α,α-diethylacetamide,etc.

The compounds of Formula I can be prepared by the steps of (a) condensing a dialkali metal salt, e.g., a disodium salt, of α-mercapto-α,α-diethylacetic acid with a halo ether or alcohol having the formula $$RO(CH_2)_n—X \quad (II)$$

wherein R and $n$ have the meanings given above for Formula I and X is halogen, e.g., chlorine, bromine, or iodine, to form a reaction product of the formula

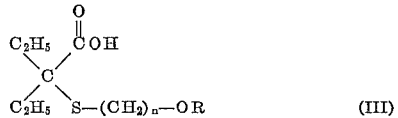

(III)

wherein R and $n$ have the meanings given above for Formula I, and (b) converting the compound of Formula III into a compound of Formula I by known methods, e.g., by treatment with an inorganic acid halide, e.g., $PCl_3$, $PBr_3$, $PCl_5$, $SOCl_2$, etc., followed by reaction of the resulting product with ammonia. Where R is hydrogen in Formula III, the —OH group must be protected, such as by a lower alkanoyl group, until after formation of the amide, whereupon the protecting group is removed, e.g., by hydrolysis.

The invention will be better understood from a consideration of the following examples which are given for illustration purposes only and are not meant to limit the invention.

EXAMPLE 1

α-(2-methoxyethylmercapto)-α,α-diethylacetamide 30 g. of α-mercapto-α,α-diethylacetic acid, dissolved in 50 cc. of ethanol, is added slowly in a nitrogen atmosphere to a cooled and stirred solution of 9,2 g. of sodium in 400 cc. of ethanol. 31 g. of 2-methoxyethylbromide in 50 cc. of ethanol is then added gradually. The mixture is stirred at room temperature for 16 hours. A white solid precipitates during the reaction. Without filtration, the ethanol is removed in vacuo, and the residue dissolved in water. The solution is acidified, extracted with ether, and the extract dried over sodium sulfate. After removal of the ether, the residue is fractionated in vacuo, yielding 26 g. of α-(2-methoxyethylmercapto)-α,α-diethylacetic acid as a colorless oil, boiling at 131–133°/0.15 mm.

26 g. of α-(2-methoxyethylmercapto)-α,α-diethylacetic acid is refluxed for 2 hours with 65 cc. of thionyl chloride. After removal of the excess thionyl chloride, the residue is fractionated in vacuo, yielding 25 g. of α-(2-methoxyethylmercapto)-α,α-diethylacetylchloride, boiling at 100–102°/0.4 mm.

25 g. of α-(2-methoxyethylmercapto)-α,α-diethylacetylchloride in 100 cc. of ether is added gradually to a solution of 15 g. of ammonia in 300 cc. of ether. After standing for 5 hours at room temperature, water is added to dissolve the precipitated ammonium chloride. The organic layer is separated and dried over sodium sulfate. After removal of the ether, the residue is fractionated in vacuo. α-(2-methoxyethylmercapto)-α,α-diethylacetamide is obtained as a colorless oil boiling at 142–144°/0.3 mm., which solidifies in the refrigerator to white crystals melting at 35–37°. Yield 15 g.

EXAMPLE 2

α-(2-ethoxyethylmercapto)-α,α-diethylacetamide 30 g. of α-mercapto-α,α-diethylacetic acid, dissolved in 50 cc. of ethanol, is added slowly in a nitrogen atmosphere to a cooled and stirred solution of 9.2 g. of sodium in 400 cc. of ethanol. 37 g. of 2-ethoxyethylbromide in 50 cc. of ethanol is then added gradually and the mixture stirred at room temperature for 16 hours. A white solid precipitates during the reaction. Without filtration, the ethanol is removed in vacuo, and the residue dissolved in water. The solution is acidified, extracted with ether, and the extract dried over sodium sulfate. After removal of the ether, the residue is fractionated in vacuo, yielding 34 g. of α-(2-ethoxyethylmercapto)-α,α-diethylacetic acid as a colorless liquid boiling at 148–152°/0.5 mm.

34 g. of α-(2-ethoxyethylmercapto)-α,α-diethylacetic acid is refluxed for 2 hours with 80 cc. of thionyl chloride. After removal of the excess thionyl chloride, the residue is fractionated in vacuo, yielding 33 g. of α-(2-ethoxyethylmercapto)-α,α - diethylacetylchloride, boiling at 90–93°/0.2 mm.

33 g. of α-(2-ethoxyethylmercapto)-α,α-diethylacetylchloride in 100 cc. of ether is added gradually to a solution of 18 g. of ammonia in 500 cc. of ether. After standing at room temperature for 5 hours, water is added to dissolve the precipitated ammonium chloride. The organic layer is separated and dried over sodium sulfate. After removal of the ether, the residue is fractionated in vacuo. α-(2-ethoxyethylmercapto)-α,α-diethylacetamide is obtained as a colorless liquid boiling at 134–137°/0.4 mm., and solidifying in the refrigerator to white crystals melting at 34–35°. Yield 23 g.

EXAMPLE 3

α-(2-butoxyethylmercapto)-α,α-diethylacetamide 30 g. of α-mercapto-α,α-diethylacetic acid, dissolved in 50 cc. of ethanol, is added slowly in a nitrogen atmosphere to a cold and stirred solution of 9.2 g. of sodium in 400 cc. of ethanol. 44 g. of 2-butoxyethylbromide in 100 cc. of ethanol is then added gradually and the mixture stirred at room temperature for 16 hours. A white solid precipitates during the reaction. Without filtration, the ethanol is removed in vacuo, and the residue dissolved in water. The solution is acidified, extracted with ether, and the extract dried over sodium sulfate. After removal of the ether, the residue is fractionated in vacuo, yielding 34 g. of α-(2-butoxyethylmercapto)-α,α-diethylacetic acid as a colorless liquid boiling at 149–154°/0.5 mm.

34 g. of α-(2-butoxyethylmercapto)-α,α-diethylacetic acid is refluxed for 2 hours with 80 cc. of thionyl chloride. After removal of the excess thionyl chloride, the residue is fractionated in vacuo, yielding 34 g. of α-(2-butoxyethylmercapto)-α,α-diethylacetylchloride boiling at 111–116°/0.3 mm.

34 g. of α-(2-butoxyethylmercapto)-α,α-diethylacetylchloride in 100 cc. of ether is added gradually to a solution of 20 g. of ammonia in 500 cc. of ether. After standing for 6 hours at room temperature, water is added to dissolve the precipitated ammonium chloride. The organic layer is separated and dried over sodium sulfate. After removal of the ether, the residue is fractionated in vacuo. α-(2-butoxyethylmercapto)-α,α-diethylacetamide is obtained as a colorless liquid boiling at 140–144°/0.2 mm. Yield 23 g.

EXAMPLE 4

α-(3-hydroxypropylmercapto)-α,α-diethylacetamide 60 g. of α-mercaptodiethylacetic acid in 100 cc. of ethanol is added slowly in a nitrogen atmosphere to a cooled and stirred solution of 18.4 g. of sodium in 800 cc. of ethanol. 60 g. of 3-bromo-1-propanol in 100 cc. of ethanol is then added gradually, and the mixture stirred at room temperature for 16 hours. A white solid precipitates during the reaction. Without filtration, the ethanol is removed in vacuo, and the residue dissolved in water. The solution is acidified, extracted with ether, and the extract dried over sodium sulfate. After removal of the ether, the residue is fractionated in vacuo, yielding 66 g. of α-(3-hydroxypropylmercapto)-α,α-diethylacetic acid as colorless oil boiling at 175–180°/0.3 mm.

25 g. of α-(3-hydroxypropylmercapto)-α,α-diethylacetic acid, dissolved in 30 cc. of benzene, is added in portions to 31 g. of acetylchloride in 300 cc. of benzene, and the mixture refluxed for 3 hours. After removal of the solvent, the liquid residue is mixed with 50 cc. of thionyl chloride and refluxed for 3 hours. The residue obtained after removal of the excess thionyl chloride is dissolved in 100 cc. of ether and the solution added gradually to a solution of 15 g. of ammonia in 400 cc. of ether. After standing for 6 hours at room temperature, water is added to dissolve the precipitated ammonium chloride. The organic layer is separated and dried over sodium sulfate. After removal of the ether, a liquid residue is obtained, which solidifies slowly. Recrystallization from benzene-petroleum ether yields 24 g. of α-(3-acetoxypropylmercapto)-α,α-diethylacetamide as white crystals melting at 65–67°.

23 g. of α-(3-acetoxypropylmercapto)-α,α-diethylacetamide is dissolved in 400 cc. of 2.5 percent aqueous sodium hydroxide and kept overnight at room temperature. The mixture is then acidified and extracted with ether. The ether extract is dried over sodium sulfate. After removal of the ether, the residue is fractionated in vacuo. α-(3-hydroxypropylmercapto)-α,α-diethylacetamide is obtained as a colorless liquid boiling at 168–169°/0.3 mm. Yield 14 g.

EXAMPLE 5

α-(3-methoxypropylmercapto)-α,α-diethylacetamide 27 g. of α-mercapto-α,α-diethylacetic acid, dissolved in 50 cc. of ethanol, is added slowly, in a nitrogen atmosphere, to a cooled and stirred solution of 8.3 g. of sodium in 350 cc. of ethanol. 22 g. of 3-methoxypropyl- chloride in 50 cc. of ethanol is then added gradually, and the mixture is stirred at room temperature for 16 hours. A white solid precipitates during the reaction. Without filtration, the ethanol is removed in vacuo, and the residue dissolved in water. The solution is acidified, extracted with ether, and the extract dried over sodium sulfate. After removal of the ether, the residue is fractionated in vacuo, yielding 25 g. of α-(3-methoxypropylmercapto)-α,α-diethylacetic acid as a colorless oil, boiling at 151–158°/0.4 mm.

25 g. of α-(3-methoxypropylmercapto)-α,α-diethylacetic acid is refluxed with 25 cc. of thionyl chloride for 2 hours. After removal of the excess thionyl chloride, the residue is fractionated in vacuo, yielding 23 g. of α-(3 - methoxypropylmercapto) - α,α - diethylacetylchloride boiling at 99–101°/0.3 mm.

23 g. of α-(3-methoxypropylmercapto)-α,α-diethylacetylchloride in 100 cc. of ether is added gradually to a solution of 10 g. of ammonia in 300 cc. of ether. After standing at room temperature for 5 hours, water is added to dissolve the precipitated ammonium chloride. The organic layer is separated and dried over sodium sulfate. After removal of the ether, the residue is fractionated in vacuo. α - (3 - methoxypropylmercapto) - α,α - diethylacetamide is obtained as a colorless liquid boiling at 148°/0.3 mm. Yield 16 g.

EXAMPLE 6

α-(3-ethoxypropylmercapto)-α,α-diethylacetamide 123 g. of α-mercapto-α,α-diethylacetic acid in 100 cc. of ethanol is added gradually in a nitrogen atmosphere to a cooled and stirred solution of 37.7 g. of sodium in 1300 cc. of ethanol. 144 g. of 3-ethoxypropylbromide in 100 cc. of ethanol is then added and the mixture stirred for 16 hours at room temperature. A white solid precipitates during the reaction. Without filtration, the ethanol is removed in vacuo, and the residue dissolved in water. The solution is acidified, extracted with ether, and the extract dried over sodium sulfate. After removal of the ether, the residue is fractionated in vacuo, yielding 143 g. of α-(3-ethoxypropylmercapto)-α,α-diethylacetic acid as a colorless oil, boiling at 154–159°/0.5 mm.

143 g. of α-(3-ethoxypropylmercapto)-α,α-diethylacetic acid are mixed with 200 cc. of thionyl chloride and refluxed for 2½ hours. After removal of the excess thionyl chloride, the residue is fractionated in vacuo, yielding 150 g. of α-(3-ethoxypropylmercapto)-α,α-diethylacetylchloride boiling at 102–106°/0.3 mm.

150 g. of α-(3-ethoxypropylmercapto)-α,α-diethylacetylchloride dissolved in 200 cc. of ether is gradually added to a solution of 40 g. of ammonia in 800 cc. of ether. After standing at room temperature for 6 hours, water is added to dissolve the precipitated ammonium chloride. The organic layer is separated and dried over sodium sulfate. After removal of the ether, α-(3-ethoxypropylmercapto)-α,α-diethylacetamide is obtained as a liquid which solidifies slowly in the cold. After two recrystallizations from pentane, white crystals are obtained, melting at 41–42°. Yield 130 g.

EXAMPLE 7

α-(3-methoxybutylmercapto)-α,α-diethylacetamide 30 g. of α-mercapto-α,α-diethylacetic acid dissolved in 50 cc. of ethanol is added slowly in a nitrogen atmosphere to a cooled and stirred solution of 9.2 g. of sodium in 400 cc. of ethanol. 35 g. of 3-methoxybutylbromide in 50 cc. of ethanol is then added gradually, and the mixture stirred at room temperature for 16 hours. A white solid precipitates during the reaction. Without filtration, the ethanol is removed in vacuo, and the residue dissolved in water. The solution is acidified, extracted with ether, and the extract dried over sodium sulfate. After removal of the ether, the residue is fractionated in vacuo yielding 38 g. of α-(3-methoxybutylmercapto)-α,α-diethylacetic acid as a colorless oil boiling at 144–149°/0.3 mm.

38 g. of α-(3-methoxypropylmercapto)-α,α-diethylacetic acid is refluxed with 50 cc. of thionyl chloride for 2 hours. After removal of the excess thionyl chloride, the residue is fractionated in vacuo, yielding 35 g. of α-(3-methoxybutylmercapto) - α,α-diethylacetylchloride boiling at 100–103°/0.3 mm.

35 g. of α-(3-methoxybutylmercapo)-α,α-diethylacetylchloride in 100 cc. of ether is added gradually to a solution of 15 g. of ammonia in 500 cc. of ether. After standing for 5 hours at room temperature, water is added to dissolve the precipitated ammonium chloride. The organic layer is separated and dried over sodium sulfate. After removal of the ether, the residue is fractionated in vacuo. α-(3-methoxybutylmercapto)-α,α-diethylacetamide is obtained as a colorless oil, boiling at 145–146°/0.4 mm. Yield 22 g.

EXAMPLE 8

*α-(5-ethoxypentylmercapto)-α,α-diethylacetamide*

30 g. of α-mercapto-α,α-diethylacetic acid dissolved in 50 cc. of ethanol is added slowly in a nitrogen atmosphere to a cooled and stirred solution of 9.2 g. of sodium in 400 cc. of ethanol. 40 g. of 5-ethoxypentylbromide in 50 cc. of ethanol is then added gradually, and the mixture stirred for 16 hours at room temperature. A white solid precipitates during the reaction. Without filtration, the ethanol is removed in vacuo, and the residue dissolved in water. The solution is acidified, extracted with ether, and the extract dried over sodium sulfate. After removal of the ether, the residue is fractionated in vacuo, yielding 35 g. of α-(5-ethoxypentylmercapto)-α,α-diethylacetic acid, boiling at 185–187°/1 mm.

35 g. of α-(5-ethoxypentylmercapto)-α,α-diethylacetic acid is refluxed with 70 cc. of thionyl chloride for 2 hours. After removal of the excess thionyl chloride, the residue is fractionated in vacuo, yielding 33 g. of α-(5-ethoxypentylmercapto)-α,α-diethylacetylchloride boiling at 135–138°/0.5 mm.

33 g. of α-(5-ethoxypentylmercapto)-α,α-diethylacetylchloride in 100 cc. of ether is added slowly to a solution of 15 g. of ammonia in 500 cc. of ether. After standing for 4 hours at room temperature, water is added to dissolve the precipitated ammonium chloride. The organic layer is separated and dried over sodium sulfate. After removal of the ether, the residue is fractionated in vacuo. α-(5-ethoxypropylmercapto)-α,α-diethylacetamide is obtained as a colorless liquid, boiling at 163–166°/0.4 mm. Yield 22 g.

EXAMPLE 9

*α-(6-ethoxyhexylmercapto)-α,α-diethylacetamide*

30 g. of α-mercapto-α,α-diethylacetic acid in 50 cc. of ethanol are added slowly in a nitrogen atmosphere to a cooled and stirred solution of 9.2 g. of sodium in 400 cc. of ethanol. 44 g. of 6-ethoxyhexylbromide in 100 cc. of ethanol is then added gradually. The mixture is stirred for 16 hours at room temperature. A white solid precipitates during the reaction. Without filtration, the ethanol is removed in vacuo and the residue dissolved in water. The solution is acidified, extracted with ether, and the extract dried over sodium sulfate. After removal of the ether, the residue is fractionated in vacuo, yielding 39.5 g. of α-(6-ethoxyhexylmercapto)-α,α-diethylacetic acid, boiling at 174–179°/0.4 mm.

39.5 g. of α-(6-ethoxyhexylmercapto)-α,α-diethylacetic acid is refluxed with 80 cc. of thionyl chloride for 2 hours. After removal of the excess thionyl chloride, the residue is fractionated in vacuo, yielding 37 g. of α-(6-ethoxyhexylmercapto)-α,α-diethylacetylchloride boiling at 152–155°/0.5 mm.

37 g. of α-(6-ethoxyhexylmercapto)-α,α-diethylacetylchloride in 100 cc. of ether is added gradually to a solution of 15 g. of ammonia in 500 cc. of ether. After standing for 5 hours at room temperature, water is added to dissolve the precipitated ammonium chloride. The organic layer is separated and dried over sodium sulfate. After removal of the ether, the residue is fractionated in vacuo. α-6-ethoxyhexylmercapto)-α,α-diethylacetamide is obtained as a colorless liquid boiling at 183–185°/0.3 mm. Yield 29 g.

EXAMPLE 10

*α-[2-(2-ethoxyethoxy)ethylmercapto]-α,α-diethylacetamide*

30 g. of α-mercapto-α,α-diethylacetic acid, dissolved in 50 cc. of ethanol is added slowly in a nitrogen atmosphere to a cooled and stirred solution of 9.2 g. of sodium in 400 cc. of ethanol. 44 g. of 2-(2-ethoxyethoxy)ethylbromide in 100 cc. of ethanol is then added gradually. The mixture is refluxed for 16 hours at room temperature. A white solid precipitates during the reaction. Without filtration, the ethanol is removed in vacuo, and the residue dissolved in water. The solution is acidified, extracted with ether, and the extract dried over sodium sulfate. After removal of the ether, the residue is fractionated in vacuo, yielding 36 g. of α-[2-(2-ethoxyethoxy)ethylmercapto]-α,α-diethylacetic acid boiling at 184–190°/0.3 mm.

36 g. of α-[2-(2-ethoxyethoxy)ethylmercapto]-α,α-diethylacetic acid is refluxed with 40 cc. of thionyl chloride for 2½ hours. After removal of the excess thionyl chloride, the residue is fractionated in vacuo, yielding 34 g. of α - [23-(2-ethoxyethoxy)ethylmercapto]-α,α-diethylacetylchloride, boiling at 127–130°/0.5 mm.

34 g. of α-[2-(2-ethoxyethoxy)ethylmercapto]-α,α-diethylacetylchloride in 100 cc. of ether is added gradually to a solution of 15 g. of ammonia in 500 cc. of ether. After standing at room temperature for 5 hours, water is added to dissolve the precipitated ammonium chloride. The organic layer is separated and dried over sodium sulfate. After removal of the ether, the residue is fractionated in vacuo. α-[2-(2-ethoxyethoxy)ethylmercapto]-α,α-diethylacetamide is obtained as a colorless oil, boiling at 188–192°/0.6 mm. Yield 24 g.

We claim:

1. A compound of the formula

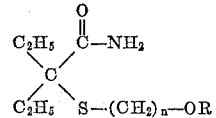

wherein R is selected from the group consisting of hydrogen, lower alkyl, and lower alkoxy lower alkyl, and $n$ is a whole number in the range 2 through 6.

2. α-(3-ethoxypropylmercapto)-α,α-diethylacetamide.
3. α-(3-methoxypropylmercapto)-α,α-diethylacetamide.
4. α-(2-ethoxyethylmercapto)-α,α-diethylacetamide.
5. α-(2-butoxyethylmercapto)-α,α-diethylacetamide.
6. A compound of the formula

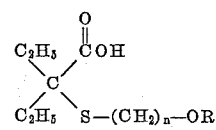

wherein R is selected from the group consisting of hydrogen, lower alkyl, and lower alkoxy lower alkyl, and $n$ is a whole number in the range 2 to 6.

References Cited by the Examiner
UNITED STATES PATENTS

| | | | |
|---|---|---|---|
| 2,184,495 | 12/39 | Graenacher et al. | 260—561 |
| 2,397,960 | 4/46 | Gribbins et al. | 260—537 XR |
| 2,874,190 | 2/59 | Goldberg et al. | 260—561 |

IRVING MARCUS, *Primary Examiner.*

JOHN D. RANDOLPH, *Examiner.*